(12) United States Patent
Grant, III et al.

(10) Patent No.: US 12,273,138 B2
(45) Date of Patent: Apr. 8, 2025

(54) PROTECTIVE ENCLOSURE FOR AN ELECTRONIC DEVICE

(71) Applicant: Otter Products, LLC, Fort Collins, CO (US)

(72) Inventors: Richard W. Grant, III, San Diego, CA (US); Michael S. Skahan, Ramona, CA (US)

(73) Assignee: Otter Products, LLC, Fort Collins, CO (US)

( * ) Notice: Subject to any disclaimer, the term of this patent is extended or adjusted under 35 U.S.C. 154(b) by 420 days.

(21) Appl. No.: 17/970,717

(22) Filed: Oct. 21, 2022

(65) Prior Publication Data

US 2023/0135549 A1    May 4, 2023

Related U.S. Application Data (60) Provisional application No. 63/272,942, filed on Oct. 28, 2021.

(51) Int. Cl.
*H04B 1/3888*    (2015.01)

(52) U.S. Cl.
CPC .................................. *H04B 1/3888* (2013.01)

(58) Field of Classification Search
CPC ......... H04B 1/3888; H04B 2001/3894; H04B 1/38; H04B 1/717; H04B 11/00;
(Continued)

(56) References Cited

U.S. PATENT DOCUMENTS

| 2,392,787 A | 1/1946 | Edmond |
| 3,023,885 A | 3/1962 | Kindseth |

(Continued)

FOREIGN PATENT DOCUMENTS

| CN | 2921496 | 7/2007 | |
| EP | 3005666 B1 * | 5/2019 | ........... G06F 1/1626 |

(Continued)

OTHER PUBLICATIONS

Donaldson Filtration Solutions, Acoustic Vents for Portable Electronics, dated 2012-2017, downloaded from https://www.donaldson.com/content/dam/donaldson/venting/literature/north-america/Brochures/acoustic-vents-portable-electronics/Acoustic-Vents-for-Portable-Electronics.pdf Jan. 16, 2018, 4 pages.

(Continued)

*Primary Examiner* — Nathan S Taylor (57) ABSTRACT

A protective enclosure for an electronic device includes a back member which includes a pressure equalization membrane configured to equalize air pressure between an area inside the protective enclosure with an area outside the protective enclosure. The protective enclosure also includes a front member configured to engage with the back member to enclose the electronic device and having clasping features that engage with clasping features of the back member to removably engage the front member with the back member. The protective enclosure also includes a spacer pad having one or more air channels extending across a surface of the spacer pad, wherein the pressure equalization membrane is adjacent a portion of the one or more air channels when the spacer pad is in the protective enclosure.

20 Claims, 11 Drawing Sheets

(58) Field of Classification Search
CPC . H04B 5/79; H05K 5/03; H05K 5/068; H05K 5/0213; H05K 5/0217; H05K 5/061; H05K 5/0086; H05K 5/0204; H05K 5/0215; H05K 5/0221; H05K 5/0226; H05K 5/023; H05K 5/0247; H05K 5/06; H05K 7/12; H05K 7/186; H05K 7/20154; H05K 7/2039; G06F 2200/1633; H04M 1/18; H04W 4/80; H04W 12/02; H04W 12/03; H04W 12/33; H04W 12/63; H04W 4/029; H04W 80/085; H04W 84/12; H04W 88/06; H04W 88/08; H04W 88/10
USPC ..................................................... 455/575.8
See application file for complete search history.

(56) References Cited

U.S. PATENT DOCUMENTS

| | | | |
|---|---|---|---|
| 3,590,988 A | 7/1971 | Hollar | |
| 4,326,102 A | 4/1982 | Culp et al. | |
| 4,352,968 A | 10/1982 | Pounds | |
| 4,703,161 A | 10/1987 | McLean | |
| 4,733,776 A | 3/1988 | Ward | |
| 4,736,418 A | 4/1988 | Steadman | |
| 4,762,227 A | 8/1988 | Patterson | |
| 4,836,256 A | 6/1989 | Meliconi | |
| 4,901,852 A | 2/1990 | King | |
| 5,002,184 A | 3/1991 | Lloyd | |
| 5,025,921 A | 6/1991 | Gasparaitis et al. | |
| 5,092,458 A | 3/1992 | Yokoyama | |
| 5,092,459 A | 3/1992 | Uljanic et al. | |
| 5,123,044 A | 6/1992 | Tate | |
| 5,175,873 A | 12/1992 | Goldenberg et al. | |
| 5,230,016 A | 7/1993 | Yasuda | |
| 5,360,108 A | 11/1994 | Alagia | |
| 5,368,159 A | 11/1994 | Doria | |
| 5,386,084 A | 1/1995 | Risko | |
| 5,388,692 A | 2/1995 | Withrow et al. | |
| 5,499,713 A | 3/1996 | Huffer | |
| 5,625,688 A | 4/1997 | Ford et al. | |
| 5,648,757 A | 7/1997 | Vernace et al. | |
| 5,681,122 A | 10/1997 | Burke | |
| 5,812,188 A | 9/1998 | Adair | |
| 5,828,012 A | 10/1998 | Repolle et al. | |
| 5,850,915 A | 12/1998 | Tajima | |
| 5,873,814 A | 2/1999 | Adair | |
| 5,923,752 A | 7/1999 | McBride et al. | |
| 6,031,524 A | 2/2000 | Kunert | |
| 6,041,924 A | 3/2000 | Tajima | |
| 6,049,813 A | 4/2000 | Danielson et al. | |
| 6,068,119 A | 5/2000 | Derr et al. | |
| 6,082,535 A | 7/2000 | Mitchell | |
| 6,094,785 A | 8/2000 | Montgomery et al. | |
| 6,201,867 B1 | 3/2001 | Koike | |
| 6,215,474 B1 | 4/2001 | Shah | |
| 6,239,968 B1 | 5/2001 | Kim et al. | |
| 6,273,252 B1 | 8/2001 | Mitchell | |
| 6,301,100 B1 | 10/2001 | Iwata | |
| 6,313,892 B2 | 11/2001 | Gleckman | |
| 6,313,982 B1 | 11/2001 | Hino | |
| 6,317,313 B1 | 11/2001 | Mosgrove et al. | |
| 6,388,877 B1 | 5/2002 | Canova et al. | |
| 6,415,138 B2 | 7/2002 | Sirola et al. | |
| 6,445,577 B1 | 9/2002 | Madsen et al. | |
| 6,456,487 B1 | 9/2002 | Hetterick | |
| 6,471,056 B1 | 10/2002 | Tzeng | |
| 6,512,834 B1 | 1/2003 | Banter et al. | |
| 6,519,141 B2 | 2/2003 | Tseng et al. | |
| 6,536,589 B2 | 3/2003 | Chang | |
| 6,617,973 B1 | 9/2003 | Osterman | |
| 6,646,864 B2 | 11/2003 | Richardson | |
| 6,659,274 B2 | 12/2003 | Enners | |
| 6,665,174 B1 | 12/2003 | Perr et al. | |
| 6,701,159 B1 | 3/2004 | Powell | |
| 6,731,913 B2 | 5/2004 | Humphreys et al. | |
| 6,785,566 B1 | 8/2004 | Irizarry | |
| 6,839,430 B2 | 1/2005 | Kwak | |
| 6,926,141 B2 | 8/2005 | Montler | |
| 6,932,187 B2 * | 8/2005 | Banter | H04R 1/023 381/189 |
| 6,950,516 B2 | 9/2005 | Pirilä et al. | |
| 6,954,405 B2 * | 10/2005 | Polany | H04R 1/44 367/131 |
| 6,962,454 B1 | 11/2005 | Costello | |
| 6,980,777 B2 | 12/2005 | Shepherd et al. | |
| 6,995,976 B2 | 2/2006 | Richardson | |
| 7,031,148 B1 | 4/2006 | Lin | |
| 7,054,441 B2 | 5/2006 | Pletikosa | |
| 7,061,762 B2 | 6/2006 | Canova et al. | |
| 7,069,063 B2 | 6/2006 | Halkosaari et al. | |
| 7,146,701 B2 | 12/2006 | Mahoney et al. | |
| 7,147,105 B2 | 12/2006 | Gammons | |
| 7,158,376 B2 | 1/2007 | Richardson et al. | |
| 7,180,735 B2 | 2/2007 | Thomas et al. | |
| 7,194,291 B2 | 3/2007 | Peng | |
| 7,230,823 B2 | 6/2007 | Richardson et al. | |
| 7,236,588 B2 | 6/2007 | Gartrell | |
| 7,255,228 B2 | 8/2007 | Kim | |
| 7,290,654 B2 | 11/2007 | Hodges | |
| 7,312,984 B2 | 12/2007 | Richardson et al. | |
| 7,341,144 B2 | 3/2008 | Tajiri et al. | |
| 7,343,184 B2 | 3/2008 | Rostami | |
| 7,400,917 B2 | 7/2008 | Wood et al. | |
| 7,409,148 B2 | 8/2008 | Takahashi et al. | |
| 7,418,278 B2 | 8/2008 | Eriksson et al. | |
| 7,428,427 B2 | 9/2008 | Brunstrom et al. | |
| 7,436,653 B2 | 10/2008 | Yang et al. | |
| 7,449,650 B2 | 11/2008 | Richardson et al. | |
| 7,495,895 B2 | 2/2009 | Carnevali | |
| 7,555,325 B2 | 6/2009 | Goros | |
| 7,558,594 B2 | 7/2009 | Wilson | |
| 7,594,576 B2 | 9/2009 | Chen et al. | |
| 7,609,512 B2 | 10/2009 | Richardson et al. | |
| 7,623,898 B2 | 11/2009 | Holmberg | |
| 7,641,046 B2 | 1/2010 | Tsang et al. | |
| 7,663,878 B2 | 2/2010 | Swan et al. | |
| 7,663,879 B2 | 2/2010 | Richardson et al. | |
| 7,688,580 B2 | 3/2010 | Richardson et al. | |
| 7,854,434 B2 | 12/2010 | Heiman et al. | |
| 7,933,122 B2 | 4/2011 | Richardson et al. | |
| 8,112,130 B2 | 2/2012 | Mittleman et al. | |
| 8,113,482 B2 | 2/2012 | Hunnicutt | |
| 8,290,546 B2 | 10/2012 | Chen et al. | |
| 8,342,325 B2 | 1/2013 | Rayner | |
| 8,439,191 B1 | 5/2013 | Lu | |
| 8,531,834 B2 | 9/2013 | Rayner | |
| 8,605,892 B1 | 12/2013 | Owens et al. | |
| 8,695,798 B2 | 4/2014 | Simmer | |
| 8,724,841 B2 | 5/2014 | Bright et al. | |
| 8,798,304 B2 | 8/2014 | Miller et al. | |
| 8,919,549 B1 | 12/2014 | Tashjian | |
| 9,165,550 B2 | 10/2015 | Richardson et al. | |
| 9,173,314 B2 | 10/2015 | Richardson et al. | |
| 9,185,480 B2 * | 11/2015 | Howes | H04R 1/086 |
| 9,241,551 B2 | 1/2016 | Lawson et al. | |
| 9,380,369 B2 | 6/2016 | Utterman et al. | |
| 9,532,633 B1 | 1/2017 | Tan et al. | |
| 9,545,140 B1 | 1/2017 | Johnson et al. | |
| 9,609,930 B2 | 4/2017 | Richardson et al. | |
| 9,667,297 B1 * | 5/2017 | Miehl | H05K 5/0215 |
| 9,795,044 B2 | 10/2017 | Lai et al. | |
| 9,800,962 B2 | 10/2017 | Lai et al. | |
| 9,820,399 B1 * | 11/2017 | Makiej | H05K 5/03 |
| 9,853,674 B2 | 12/2017 | Gandhi et al. | |
| 2001/0048586 A1 | 12/2001 | Itou et al. | |
| 2002/0009195 A1 | 1/2002 | Schon | |
| 2002/0065054 A1 | 5/2002 | Humphreys et al. | |
| 2002/0071550 A1 | 6/2002 | Pletikosa | |
| 2002/0079244 A1 | 6/2002 | Kwong | |
| 2002/0086702 A1 | 7/2002 | Lai et al. | |
| 2002/0101707 A1 | 8/2002 | Canova et al. | |
| 2002/0136557 A1 | 9/2002 | Shimamura | |
| 2002/0137475 A1 | 9/2002 | Shou et al. | |
| 2002/0193136 A1 | 12/2002 | Halkosaari et al. | |

(56) References Cited

U.S. PATENT DOCUMENTS

| | | |
|---|---|---|
| 2003/0151890 A1 | 8/2003 | Huang et al. |
| 2004/0014506 A1 | 1/2004 | Kemppinen |
| 2005/0139498 A1 | 6/2005 | Goros |
| 2005/0279661 A1 | 12/2005 | Hodges |
| 2006/0124482 A1 | 6/2006 | Hodges |
| 2006/0186001 A1 | 8/2006 | Anderson et al. |
| 2006/0226039 A1 | 10/2006 | Goradesky |
| 2006/0255493 A1 | 11/2006 | Fouladpour |
| 2006/0279924 A1 | 12/2006 | Richardson et al. |
| 2007/0071423 A1 | 3/2007 | Fantone et al. |
| 2007/0086273 A1* | 4/2007 | Polany .................. H04R 1/021 367/131 |
| 2007/0115387 A1 | 5/2007 | Ho |
| 2007/0158220 A1 | 7/2007 | Cleereman et al. |
| 2007/0261978 A1 | 11/2007 | Sanderson |
| 2007/0297149 A1 | 12/2007 | Richardson et al. |
| 2008/0041896 A1 | 2/2008 | Holmberg |
| 2008/0083631 A1 | 4/2008 | Tsang et al. |
| 2008/0096620 A1 | 4/2008 | Lee et al. |
| 2008/0190528 A1 | 8/2008 | Steinberg |
| 2008/0316687 A1 | 12/2008 | Richardson et al. |
| 2009/0009945 A1 | 1/2009 | Johnson et al. |
| 2009/0036175 A1 | 2/2009 | Brandenburg et al. |
| 2009/0072786 A1 | 3/2009 | Lin et al. |
| 2009/0080153 A1 | 3/2009 | Richardson et al. |
| 2009/0247244 A1 | 10/2009 | Mittleman et al. |
| 2009/0283184 A1 | 11/2009 | Han |
| 2010/0072334 A1 | 3/2010 | Gette et al. |
| 2010/0093401 A1 | 4/2010 | Moran et al. |
| 2010/0093412 A1 | 4/2010 | Serra et al. |
| 2010/0096284 A1 | 4/2010 | Bau |
| 2010/0096963 A1 | 4/2010 | Mclaughlin et al. |
| 2010/0104814 A1 | 4/2010 | Richardson et al. |
| 2010/0122756 A1 | 5/2010 | Longinotti-Buitoni |
| 2010/0200456 A1 | 8/2010 | Parkinson |
| 2010/0203931 A1 | 8/2010 | Hynecek et al. |
| 2010/0240427 A1 | 9/2010 | Lee |
| 2011/0017620 A1 | 1/2011 | Latchford et al. |
| 2011/0095033 A1 | 4/2011 | Hung |
| 2011/0157800 A1 | 6/2011 | Richardson et al. |
| 2011/0226545 A1 | 9/2011 | Richardson et al. |
| 2011/0261986 A1 | 10/2011 | Murayama |
| 2012/0031788 A1 | 2/2012 | Mongan et al. |
| 2012/0034837 A1 | 2/2012 | Ngai |
| 2012/0071217 A1 | 3/2012 | Park |
| 2012/0091025 A1 | 4/2012 | Wyner et al. |
| 2012/0168056 A1 | 7/2012 | Antonini |
| 2012/0168336 A1 | 7/2012 | Schmidt et al. |
| 2012/0207314 A1 | 8/2012 | Gautama et al. |
| 2012/0228181 A1 | 9/2012 | Damon et al. |
| 2012/0261289 A1 | 10/2012 | Wyner et al. |
| 2012/0314354 A1 | 12/2012 | Rayner |
| 2012/0325720 A1 | 12/2012 | Tages et al. |
| 2013/0027849 A1* | 1/2013 | Berumen .................. H05K 5/06 361/679.01 |
| 2013/0043777 A1 | 2/2013 | Rayner |
| 2013/0063004 A1 | 3/2013 | Lai et al. |
| 2013/0063874 A1 | 3/2013 | Yi et al. |
| 2013/0098788 A1 | 4/2013 | McCarville et al. |
| 2013/0098790 A1 | 4/2013 | Hong et al. |
| 2013/0118934 A1 | 5/2013 | Green et al. |
| 2013/0156218 A1 | 6/2013 | Annacone et al. |
| 2013/0292288 A1 | 11/2013 | Willes |
| 2013/0308809 A1 | 11/2013 | Thompson et al. |
| 2013/0334071 A1 | 12/2013 | Carnevali |
| 2014/0045557 A1 | 2/2014 | Chung |
| 2014/0076767 A1 | 3/2014 | McFarland |
| 2014/0112652 A1 | 4/2014 | Latto et al. |
| 2014/0133687 A1 | 5/2014 | Lee |
| 2014/0221056 A1 | 8/2014 | Gandhi et al. |
| 2014/0252786 A1 | 9/2014 | Singhal |
| 2014/0262847 A1 | 9/2014 | Yang |
| 2014/0294217 A1 | 10/2014 | Yamaguchi et al. |
| 2014/0339012 A1* | 11/2014 | Richardson .......... G10K 11/002 181/202 |
| 2015/0171913 A1 | 6/2015 | Rayner |
| 2015/0207911 A1 | 7/2015 | Lin |
| 2016/0212526 A1 | 7/2016 | Salvatti et al. |
| 2016/0231786 A1 | 8/2016 | English et al. |
| 2016/0254836 A1 | 9/2016 | Alsberg et al. |
| 2016/0277053 A1 | 9/2016 | Chee |
| 2017/0006382 A1 | 1/2017 | Luzzato et al. |
| 2017/0230071 A1* | 8/2017 | Miehl .................. H05K 5/0215 |
| 2018/0234127 A1* | 8/2018 | Lambert .................... A61L 2/26 |
| 2019/0305406 A1* | 10/2019 | Williams ............. H01Q 1/2291 |
| 2019/0341674 A1* | 11/2019 | Rosenthal ................ H05K 5/03 |
| 2021/0086881 A1* | 3/2021 | Wang ...................... H04W 4/80 |
| 2022/0006892 A1* | 1/2022 | Perkins ................... A45C 13/42 |
| 2022/0283024 A1* | 9/2022 | Neevel .................... G01J 1/0411 |
| 2022/0284214 A1* | 9/2022 | Tomasetta ........... G06V 40/172 |
| 2024/0331196 A1* | 10/2024 | Iwafune ............... G03B 17/561 |

FOREIGN PATENT DOCUMENTS

| | | |
|---|---|---|
| JP | H0818637 A | 6/1994 |
| JP | 2001061530 A | 3/2001 |
| JP | 2001128272 A | 5/2001 |
| WO | 2011114188 A1 | 9/2011 |
| WO | 2012051358 | 12/2012 |
| WO | 2013027126 A2 | 2/2013 |

OTHER PUBLICATIONS

W.L. Gore & Associates, Gore(R) Portable Electronic Vents, dated 2016, downloaded from https://www.gore.com/sites/g/files/ypyipe116/files/2017-09/GORE_PEV_DataSheet_AcousticVents_Dust_Splash_0.pdf Jan. 16, 2018, 6 pages.

* cited by examiner

PROTECTIVE ENCLOSURE FOR AN ELECTRONIC DEVICE

CROSS REFERENCE TO RELATED APPLICATIONS

The present application claims priority to U.S. Provisional Patent Application No. 63/272,942, filed Oct. 28, 2021, which is hereby incorporated by reference in its entirety.

BACKGROUND

Various types of portable electronic devices are available for communication, information access, and entertainment purposes. Increasingly, portable electronic devices are also being used for work and industrial purposes, and often in various environments where the electronic devices could be exposed to dirt, dust, impact, drops, and/or other damaging forces. In addition, some usage environments impose additional restrictions and/or requirements on the devices. There is a need for improved accessories to help meet these additional restrictions and/or requirements. The types of electronic devices discussed herein may include mobile phones, smartphones, tablet computers, laptop computers, personal digital assistants, cameras, medical devices, measurement tools, and/or other types of electronic devices. These devices often include touchscreens, cameras, switches, buttons, and/or other interactive controls.

SUMMARY

A protective enclosure for an electronic device is provided. The protective enclosure is configured such that the electronic device can fit within the protective enclosure and be at least partially covered and/or protected from drops, shocks, damage, misuse, dirt, debris, and the like. In certain instances, the protective enclosure can include a back structural member that snaps together with a front structural member to enclose or at least partially enclose, the electronic device.

In some examples, the back member includes a pressure equalization membrane configured to equalize air pressure between an area inside the protective enclosure with an area outside the protective enclosure. In some cases, the pressure equalization membrane may be referred to as a restricted breathing apparatus, a pressure management device, or a case pressure regulator.

In some examples, the protective enclosure includes a spacer pad configured to fit between the back of the electronic device and an inside surface of the back structural member. The spacer pad may include one or more air channels extending across a surface of the spacer pad where the pressure equalization membrane is adjacent a portion of the one or more air channels when the spacer pad is in the protective enclosure.

In some examples, the spacer pad may include the one or more channels on a first side of the spacer pad and also include one or more channels on a second side of the spacer pad. The spacer pad may also include one or more ports extending between the first side of the spacer pad and the second side of the spacer pad. Further, the one or more ports may each intersect at least a portion of the one or more channels on the first side and the one or more channels on the second side.

In some examples, the protective enclosure includes a mounting interface. The mounting interface may include one or more threaded inserts.

In some examples, the protective enclosure may include an internal electrical interface for engaging an electrical connector of the electronic device for charging the electronic device. The internal electrical interface may be further configured for transmitting data to the installed electronic device and/or receiving data from the installed electronic device.

In some examples, the protective enclosure includes an external electrical interface that is electrically connected to the internal electrical interface for charging the electronic device, transmitting data to the electronic device, and/or receiving data from the electronic device from outside the protective enclosure.

In some examples, the protective enclosure includes a wireless charging coil for wirelessly receiving electrical power from outside the protective enclosure. The wireless charging coil may be configured for providing at least a portion of the received electrical power to the internal electrical interface for charging the electronic device.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the various apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The subject matter disclosed herein relates to a protective enclosure for an electronic device. It is desired to have the electronic device protected from adverse environmental conditions, mishandling, and/or damage from drops and falls. In addition, the protective enclosure may protect the use environment from aspects of the electronic device, such as electrical arcs, sparks, and/or concentrated thermal energy. The protective enclosures disclosed herein may also be referred to as an enclosure, a case, a protective case, a shell, a protective shell, a cover, and/or a protective cover.

While many of the examples disclosed herein related to a protective encasement or enclosure for a tablet computer, the protective encasement or enclosure of this disclosure can be of any suitable shape, having any suitable size, dependent on the actual dimensions of the portable electronic device it is meant to encase.

The electronic device may have a touchscreen or touch screen interface on a front surface. The touchscreen can be a capacitive sensing touch screen or other type of interactive control panel. In other embodiments, the front surface of the electronic device can have a keyboard or buttons along with, or in lieu of, a touchscreen or other display. The electronic device may also include other button, switches, sensors, or controls. The electronic device may also include one or more cameras and one or more electrical connectors.

Figure 1:
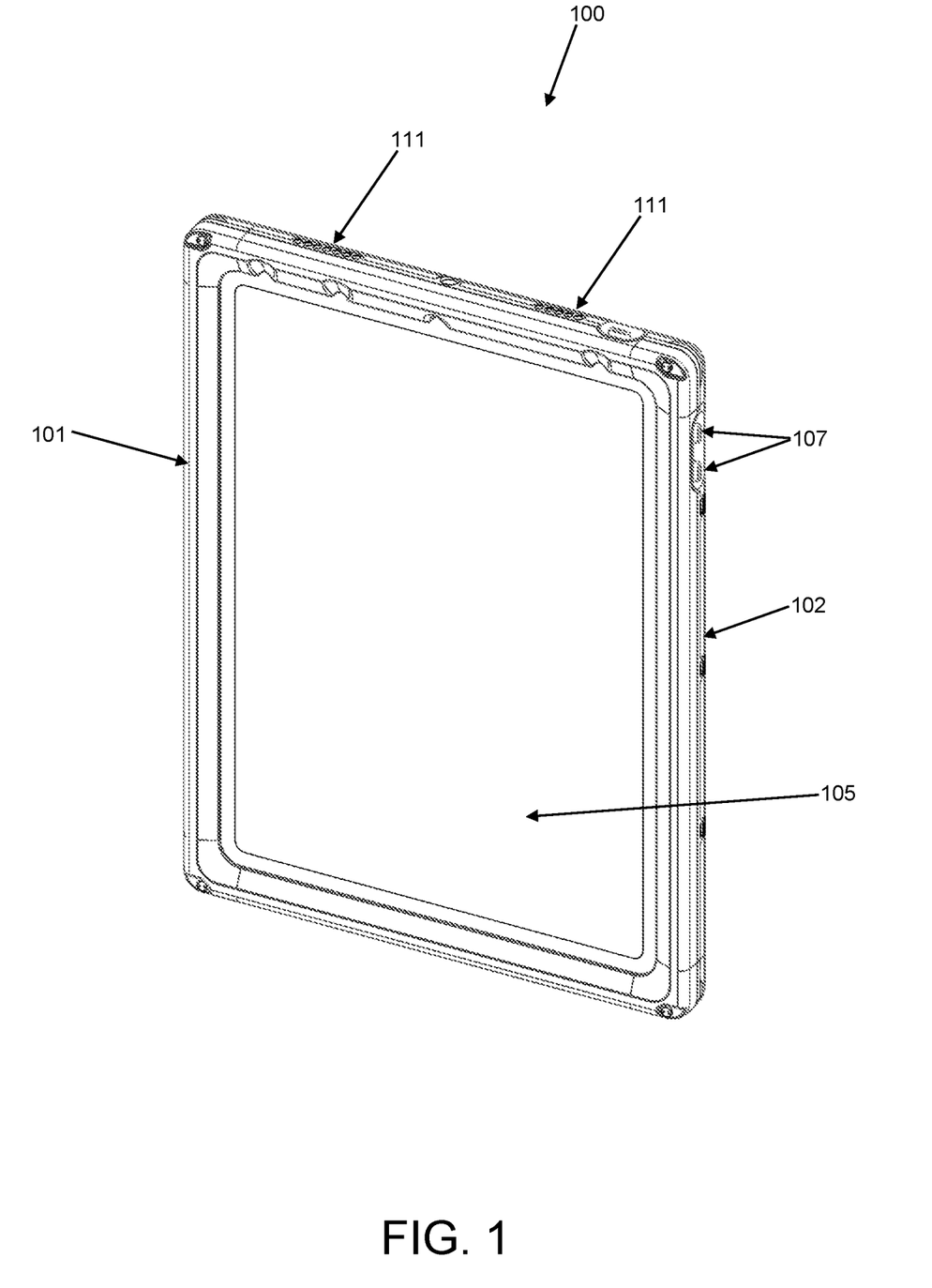
FIG. 1 illustrates a front perspective view of a protective enclosure.

FIG. 1 illustrates a protective enclosure 100. Protective enclosure 100 includes a front member 101 which removably attaches to a back member 102. Other protective enclosure configurations for enclosing an electronic device are possible. In some embodiments, the protective enclosure can comprise more than two pieces. In other embodiments, the components can snap or otherwise attach together from the top and bottom of the protective enclosure, or only cover a front portion of the electronic device, or only cover a back portion of the electronic device. Protective enclosure 100 may also be referred to as a protective case, a protective encasement, an enclosure, a case, and/or an encasement.

Front member 101 may removably attach to back member 102 with one or more snap features or snap connections, clasping features, and/or clasping mechanisms. Corresponding snap connections can have a molded male and female component. In one instance, the male snap connection can be located on front member 101 and the corresponding female snap connection can be located on back member 102. In other instances, the corresponding snap connection can be connected with the male snap connection on back member 102 and the female snap connection on front member 101. In other instances, the snap connections can be separate components that are attached to the front member and/or the back member. In some examples, an attachment feature may extend around an entire perimeter of front member 101 and/or back member 102. In some examples, a compressible, pliable, or resilient gasket may be present between front member 101 and back member 102.

In some examples, front member 101 and back member 102 may be attached to each other with one or more screws, clips, or similar fasteners. In some examples, the fastener may have a proprietary or uncommon interface or require a proprietary tool to discourage an end user or non-authorized person from opening the enclosure. In some examples, tamper evident seals or other tamper evident features may be used to indicate when the enclosure has been opened and/or the seal broken.

Front member 101 includes a protective membrane 105 that is configured or adapted to cover the touchscreen or other interactive control panel of an installed electronic device. Protective membrane 105 can also be referred to as a screen protector, a touchscreen cover, a membrane, or a film. Protective membrane 105 is transparent or substantially transparent. The touchscreen of the electronic device is operable by a user through protective membrane 105. In some examples, protective enclosure 100 may be completely sealed such that it is waterproof, water resistant, dust proof, dust resistant, and/or otherwise sealed against moisture, dust, dirt, or contaminants.

Protective enclosure 100 also includes button covers or pads 107 that are configured to allow a user to operate or activate features of the installed electronic device that can include volume buttons, power buttons, silence buttons, or the like. Button pads 107 can be configured to be depressed by a user to activate the features of the electronic device while the electronic device is installed in the protective enclosure 100. Button pads 107 may have thinner portions surrounding the pads or near the edges of the pads that allow the pads to move or flex with respect to the surrounding material for button operation.

Protective enclosure 100 may also include one or more speaker ports, such as speaker ports 111, and/or one or more microphone ports (not visible in FIG. 1). These ports may be configured with membranes to maintain the sealed nature of protective enclosure 100. In one example, speaker ports 111 may each be configured as a passive radiator and may include a thin membrane of silicone, or another material, to enable sound transmission while retaining the sealed characteristics or performance of the apparatus.

Figure 2:
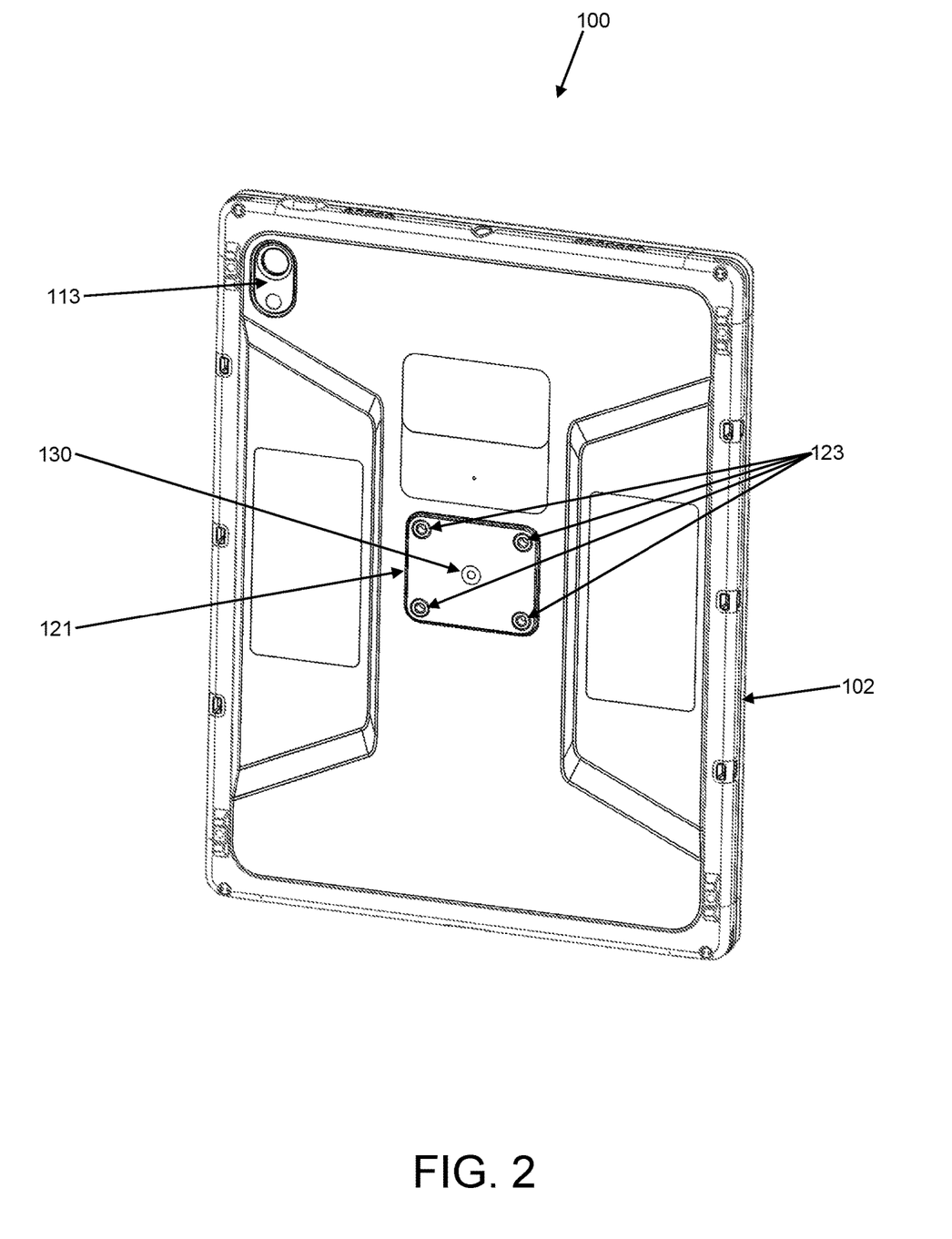
FIG. 2 illustrates a rear perspective view of the protective enclosure of FIG. 1.

FIG. 2 illustrates a rear perspective view of protective enclosure 100. Back member 102 and/or front member 101 may include one or more camera apertures, such as camera aperture 113. Camera aperture 113 may be covered with a transparent, or mostly transparent, material to preserve the sealed nature of the apparatus. Back member 102 may also include a mounting interface 121 configured or adapted for mounting protective enclosure 100 to another device, object, or surface. Many mounting interfaces and standards are possible. In some cases, mounting interface 121 may also include one or more attachment mechanisms for mounting protective enclosure 100. In one specific example, mounting interface 121 includes threaded holes or threaded inserts 123 each for receiving mounting screws.

Protective enclosure 100 may also include one or more pressure equalization membranes, such as pressure equalization membrane 130. Pressure equalization membrane 130 may also be referred to as a limited breathing apparatus, a pressure equalization apparatus, a restricted breathing apparatus, and/or a restricted breathing management apparatus. Pressure equalization membrane 130 is configured to enable small pressure adjustments, equalization, and/or relief to occur when protective enclosure 100 is sealed. Pressure adjustments may occur when the sealed enclosure goes through altitude or elevation changes and/or when significant temperature changes occur which may cause a pressure differential to occur between the inside and the outside of sealed protective enclosure 100.

Pressure equalization membrane 130 allows a small amount of air or gas to pass in a relatively slow, controlled manner to allow pressure equalization to occur without having an open port or aperture. Pressure equalization membrane 130 may have a limited or maximum flow or airflow rate or may have a restricted rate at which it will pass air or gas. Pressure equalization membrane 130 may also be water resistant and/or waterproof. In this way, small amounts of air and/or other gasses can relatively slowly move in or out of the case to keep the internal pressure approximately, roughly, or substantially equalized with the ambient pressure while still keeping protective enclosure 100 primarily sealed and/or allowing it to be classified as sealed relative to particular standards or requirements.

In addition to achieving a certain amount of water or moisture resistance while still having pressure equalization capabilities, pressure equalization membrane 130 may also satisfy other requirements, such as safety requirements. For example, in some environments where explosive gas, dangerous gas, vapors, compounds, and/or dust may be present, electronic devices may pose some risk due to the potential ability to create sparks, electrical arcs, or releasing other sufficient electrical or thermal energy to cause ignition or other damage. Protective enclosure 100 may be sufficiently sealed to reduce these types of risks associated with an installed electronic device and may enable the assembly to be classified as or meet the requirements of an intrinsically safe device at one or more levels and/or may have beneficial characteristics for use in industrial environments where ignition or explosions may be a concern. Protective enclosure 100 may enable the electronic device to be used in some environments where it may not be permitted or recommended otherwise. In addition, the electronic device is protected from harsh environments, damage, and/or corrosive gas or chemicals.

As used herein, the term 'equalization' does not necessarily mean exactly equal pressures. The devices disclosed herein may not pass air or gas unless and until a small, non-zero, pressure differential occurs. In this way, pressure equalization membrane 130 may have some amount of hysteresis and/or may allow a small pressure differential to remain. In some examples, a removable cover or cap may be included which temporarily covers or seals over pressure equalization membrane 130 when the cover or cap is in place.

Figure 3:
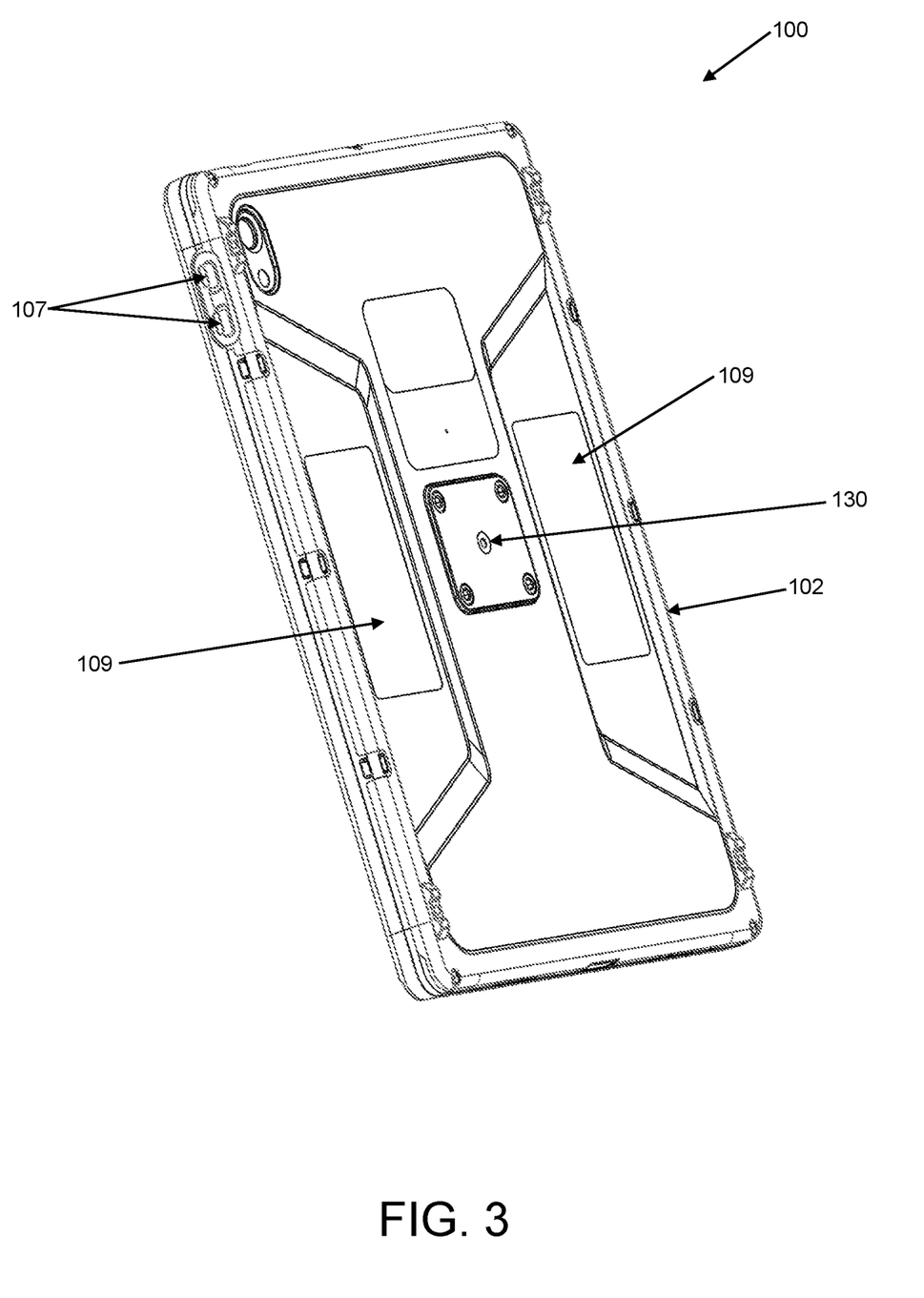
FIG. 3 illustrates an alternate rear view of the protective enclosure of FIG. 1.

FIG. 3 illustrates an alternate rear view of protective enclosure 100. Protective enclosure 100 may include grip areas 109 to make it easier to hold or carry the assembly. Grip areas 109 may be recessed. Grip areas 109 may also be textured or have an attached grip material to increase friction for holding the assembly.

Figure 4:
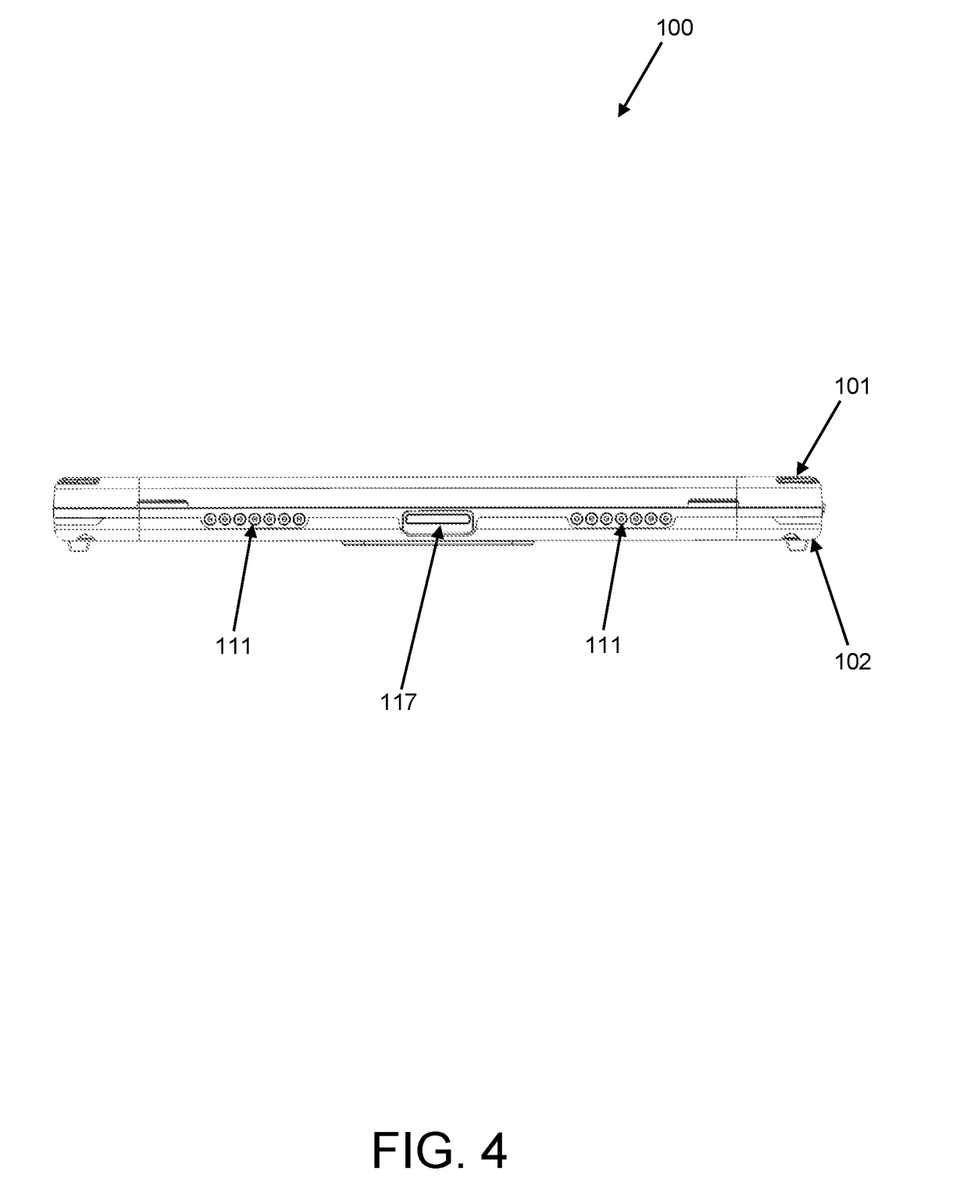
FIG. 4 illustrates a bottom end view of the protective enclosure of FIG. 1.
Figure 5:
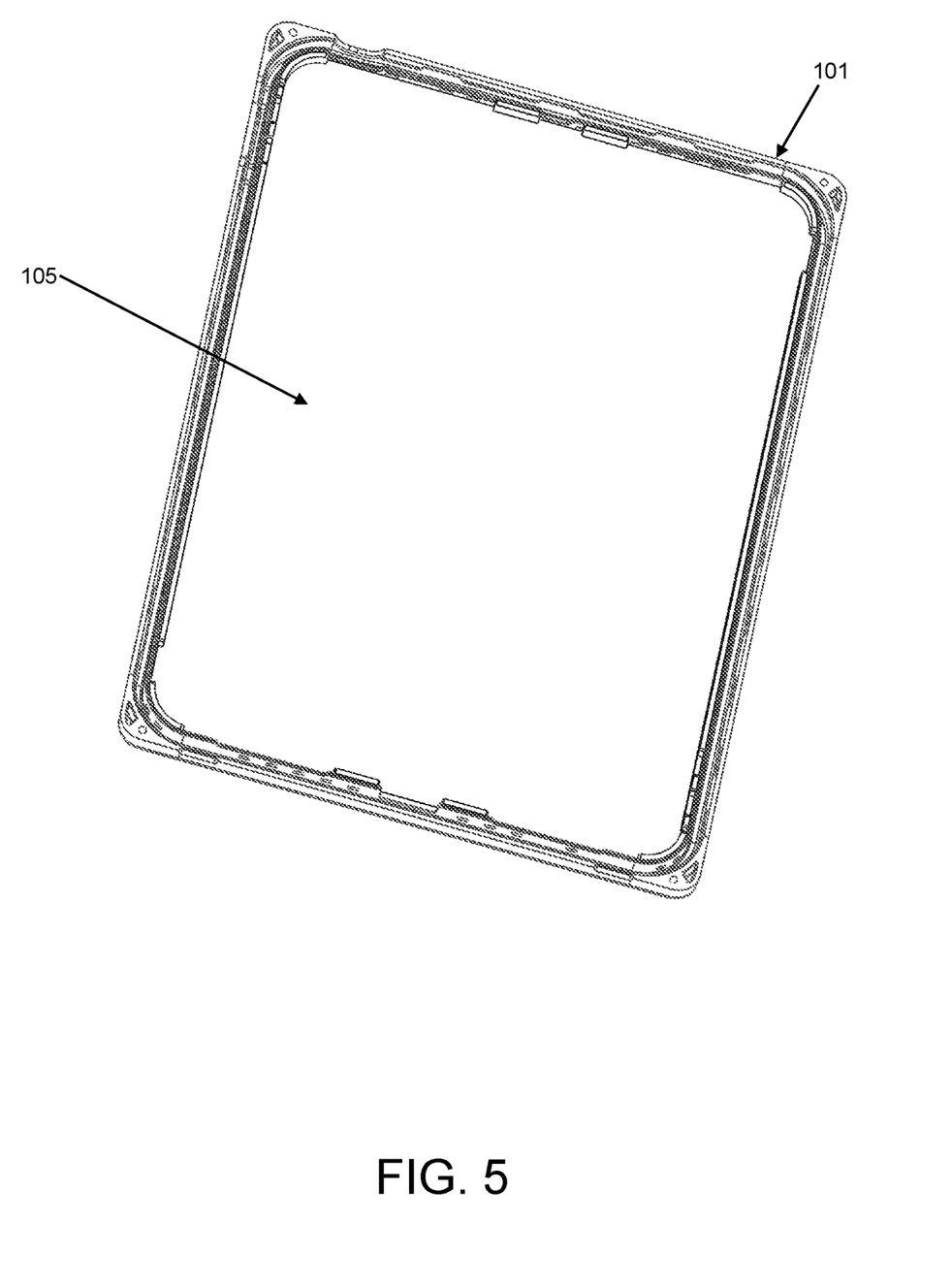
FIG. 5 illustrates a front member of the protective enclosure of FIG. 1.

FIG. 4 illustrates a bottom end view of protective enclosure 100. The bottom end may contain speaker ports 111 similar to those on the top illustrated in FIG. 1. Protective enclosure 100 may also contain an external electrical interface 117 for removably attaching an electrical connector or cable. The use of external electrical interface 117 is described with respect to subsequent figures. FIG. 5 illustrates front member 101 of protective enclosure 100.

Figure 6:
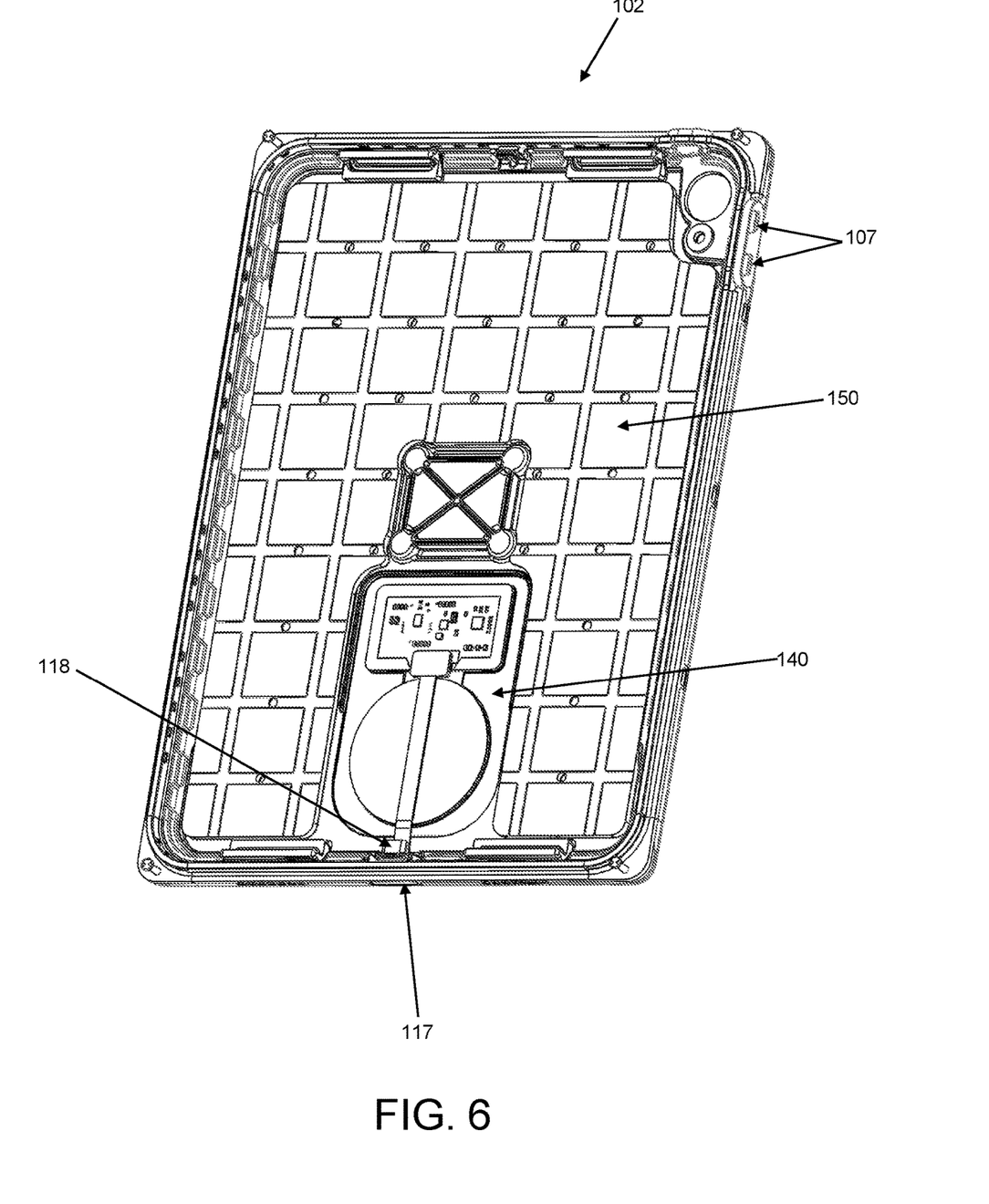
FIG. 6 illustrates a back member of the protective enclosure of FIG. 1.

FIG. 6 illustrates back member 102 of protective enclosure 100. FIG. 6 also illustrates spacer pad 150 and electronics module 140, which sit in or on back member 102 behind the electronic device. In addition to external electrical interface 117, electronics module 140 also includes internal electrical interface 118. Internal electrical interface 118 is positioned to engage and mate with an electrical port or connector of the electronic device when the electronic device is installed in protective enclosure 100. Additional details of electronics module 140 and spacer pad 150 are discussed in detail with respect to subsequent figures.

Figure 7:
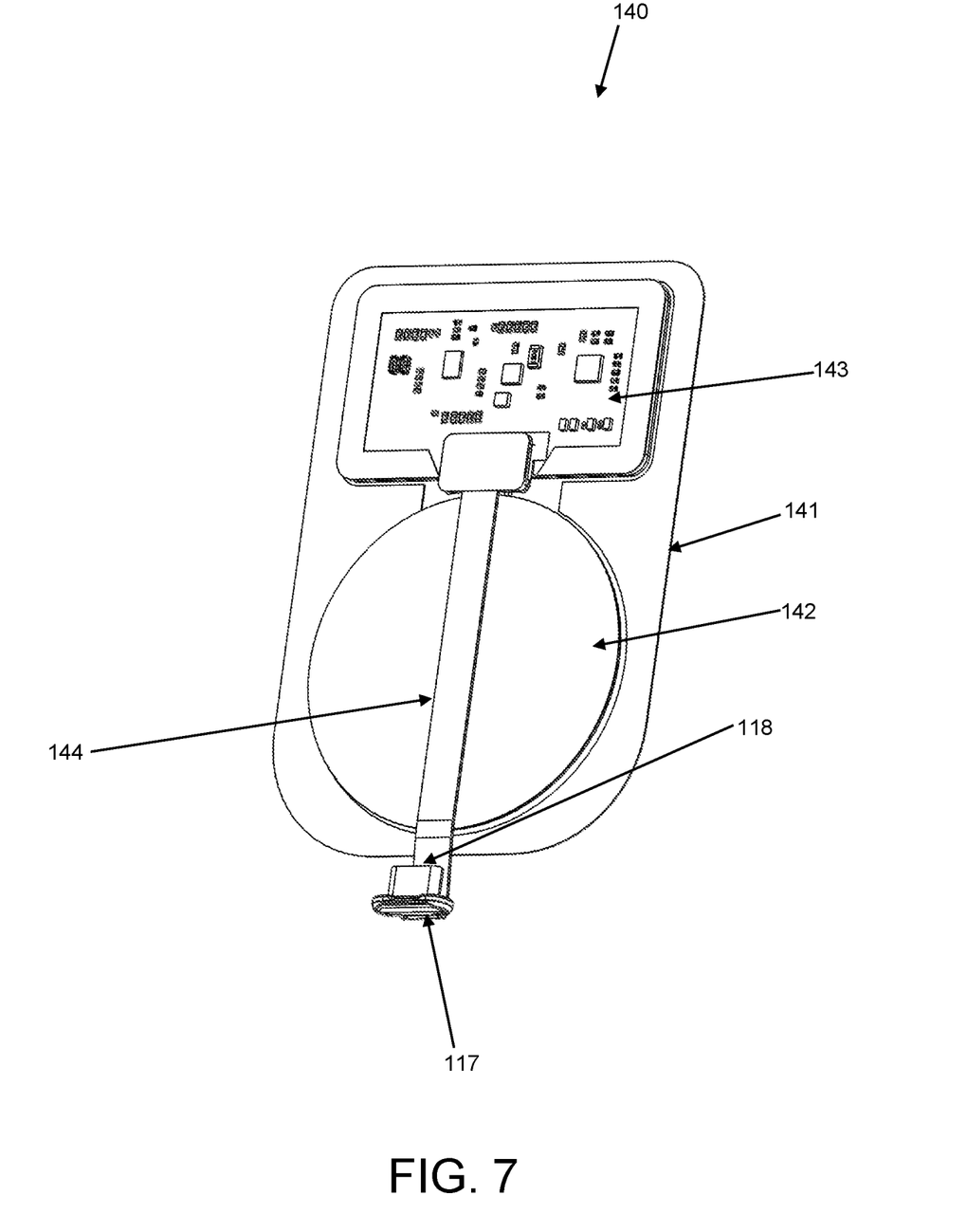
FIG. 7 illustrate an electronic module for use with the protective enclosure of FIG. 1.

FIG. 7 illustrates a detailed view of electronics module 140. Electronics module 140 includes electronics 143, external electrical interface 117, internal electrical interface 118, cable 144, and coil 142. Electronics module 140 may also include other electrical or electronic components. Internal electrical interface 118 is positioned to engage, interface, and/or mate with an electrical port or connector of the electronic device when the electronic device is installed in protective enclosure 100. In this way, a charger or charging cable attached to external interface 117 may charge the installed electronic device through internal electrical interface 118 while the electronic device is sealed in protective enclosure 100. This connection can also be used to send data to or receive data from the installed electronic device.

Alternatively, wireless charging may be utilized. Coil 142 and electronics 143 may enable wireless charging of the installed electronic device while it is installed in protective enclosure 100 even though the electronic device itself may not inherently have wireless charging capabilities. The wireless charging occurs between a charging coil outside protective enclosure 100 and coil 142 which is inside protective enclosure 100. This enables the installed electronic device to be charged while remaining sealed in protective enclosure 100 and without making or breaking an electrical contact which could cause sparking and may not be permitted in some environments. The wireless charging may occur according to an industry standard wireless charging protocol and interface and/or may be based on a proprietary standard.

Figure 8:
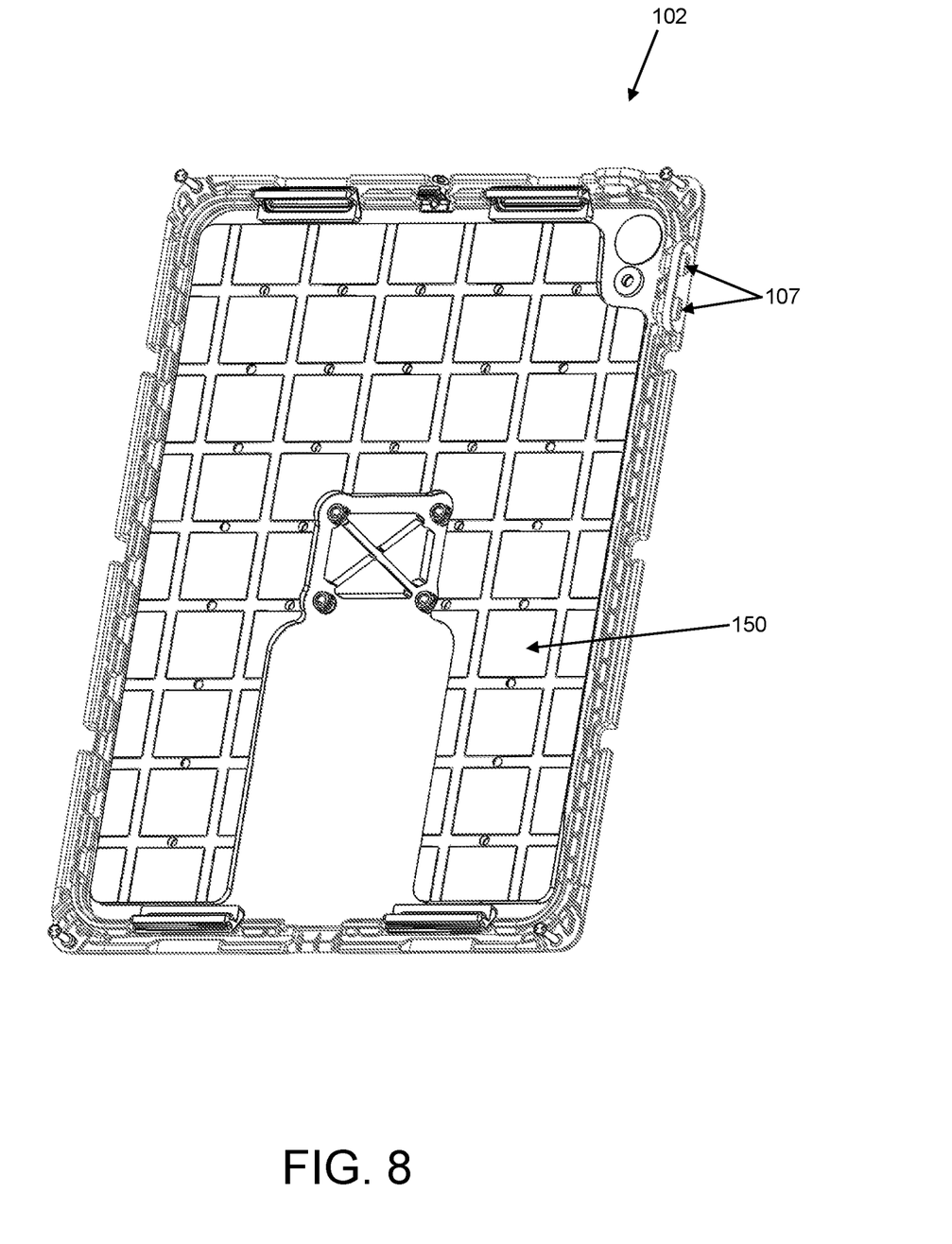
FIG. 8 illustrates the back member of FIG. 6 with the electronic module of FIG. 7 removed.

A cover or cap may also be included to cover or seal external electrical interface 117 when it is not in use. FIG. 8 illustrates the configuration of FIG. 6 with electronics module 140 removed. Electronics module 140 may be optionally included.

Figure 9:
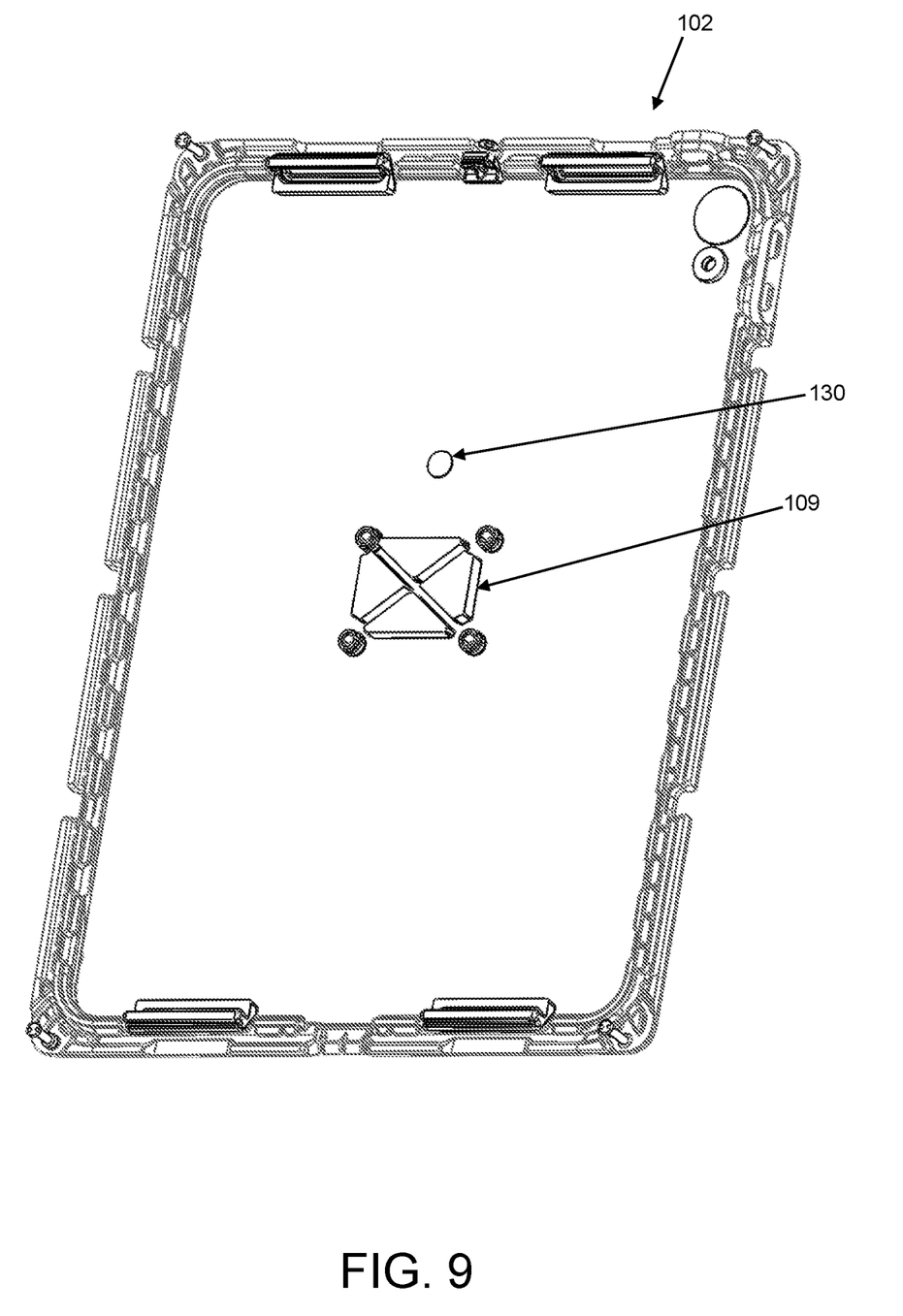
FIG. 9 illustrates the back member of FIG. 8 with a spacer pad also removed.

FIG. 9 illustrates the configuration of FIG. 8 with spacer pad 150 removed. In some examples, spacer pad 150 may be permanently attached to back member 102. In some examples, spacer pad 150 may be interchangeable with another spacer pad that fits or conforms to a different electronic device having different dimensions. FIG. 9 also illustrates cushion members 109 which may be included to provide additional support, protection, and/or cushioning to the installed electronic device by further protecting it from shock and/or impact.

Figure 10:
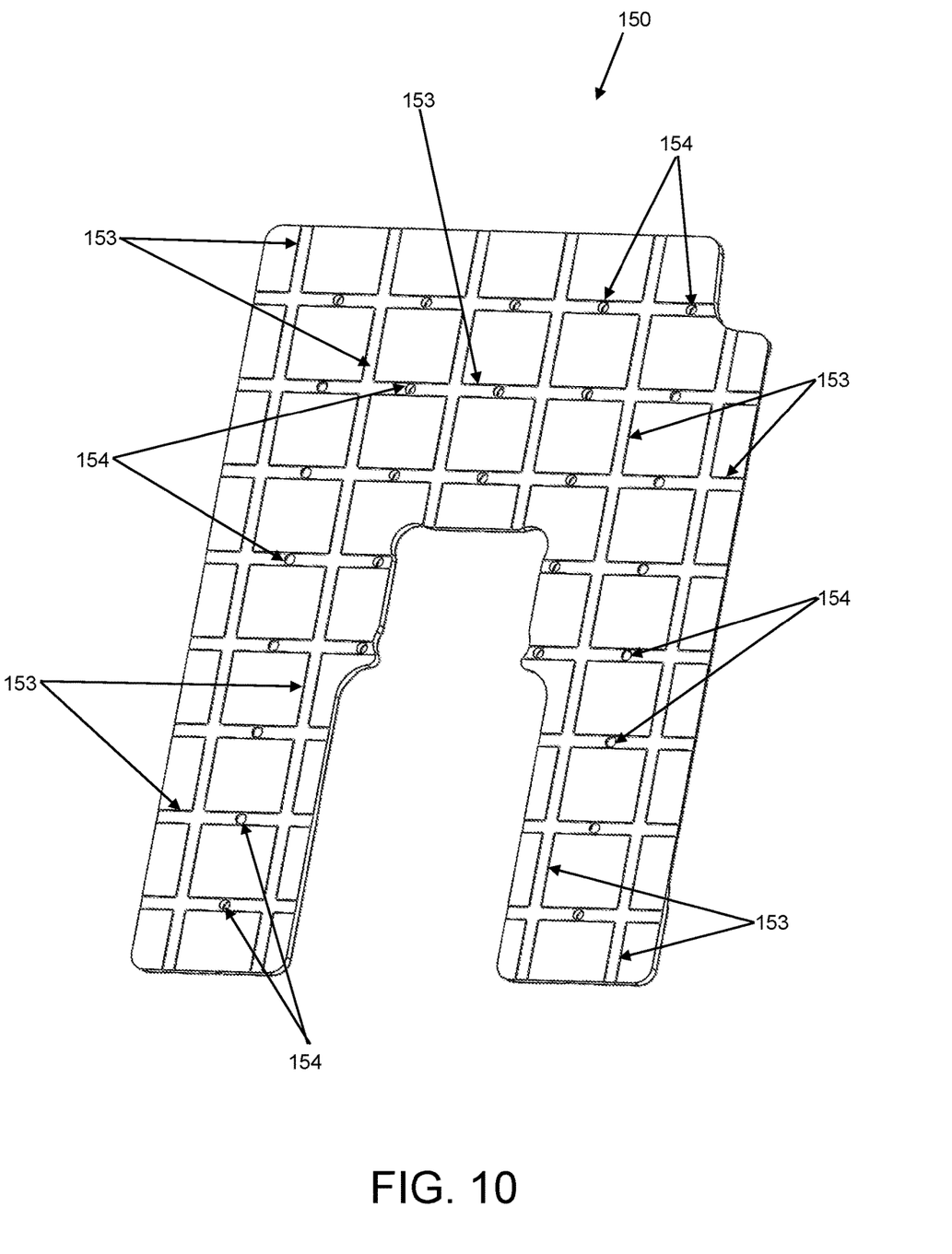
FIG. 10 illustrates a spacer pad for use with the protective enclosure of FIG. 1.

FIG. 10 illustrates spacer pad 150 removed from protective enclosure 100. While spacer pad 150 is illustrated as having a primarily flat shape, in some instances it may have varying thicknesses and/or contours in different areas for matching the shape or contour of a particular electronic device. In addition, other instances of spacer pad 150 may be shaped or sized to fit different electronic devices such that different spacer pads for different electronic devices may be used with the same front member 101 and/or back member 102.

Spacer pad 150 includes a series of recessed channels 153 extending in multiple directions. Recessed channels 153 may also be referred to as channels, air channels, slots, or grooves. Recessed channels 153 may have various quantities, sizes, shapes, cross-sectional shapes, and/or patterns. Recessed channels 153 aid or facilitate movement of air, or other gas, within protective enclosure 100 and around the installed electronic device. If spacer pad 150 did not have recessed channels 153, larger areas of it may tend to stick to the surface of the installed electronic device and may tend to hold or capture air bubbles that are not readily equalized when pressure changes occur. In other words, recessed channels 153 facilitate more even and efficient movement or distribution of air or gas when pressure changes, increases or decreases, occur in the internal cavity of protective enclosure 100.

Further, spacer pad 150 also includes apertures 154 which extend through to the other side of spacer pad 150. Apertures 154 may also be referred to as holes, openings, or feedthroughs. As illustrated, apertures 154 may be present within recessed channels 153. Apertures 154 facilitate movement of air or gas and pressure equalization between the two sides of spacer pad 150. Similar to recessed channels 153, apertures 154 aid or facilitate movement of air, or other gas, within protective enclosure 100 and around the installed electronic device to aid pressure equalization and facilitate even pressure distribution when pressure changes occur.

One or more materials of spacer pad 150 may also be chosen based on beneficial thermal transfer properties or characteristics. The electronic device may tend to get warm or hot when it is in use and/or being charged, particularly given that it is installed in protective enclosure 100. Therefore, spacer pad 150 may assist in moving or conducting thermal energy away from the electronic device and one or more materials of spacer pad 150 may be chosen based on particular thermal characteristics or properties.

Figure 11:
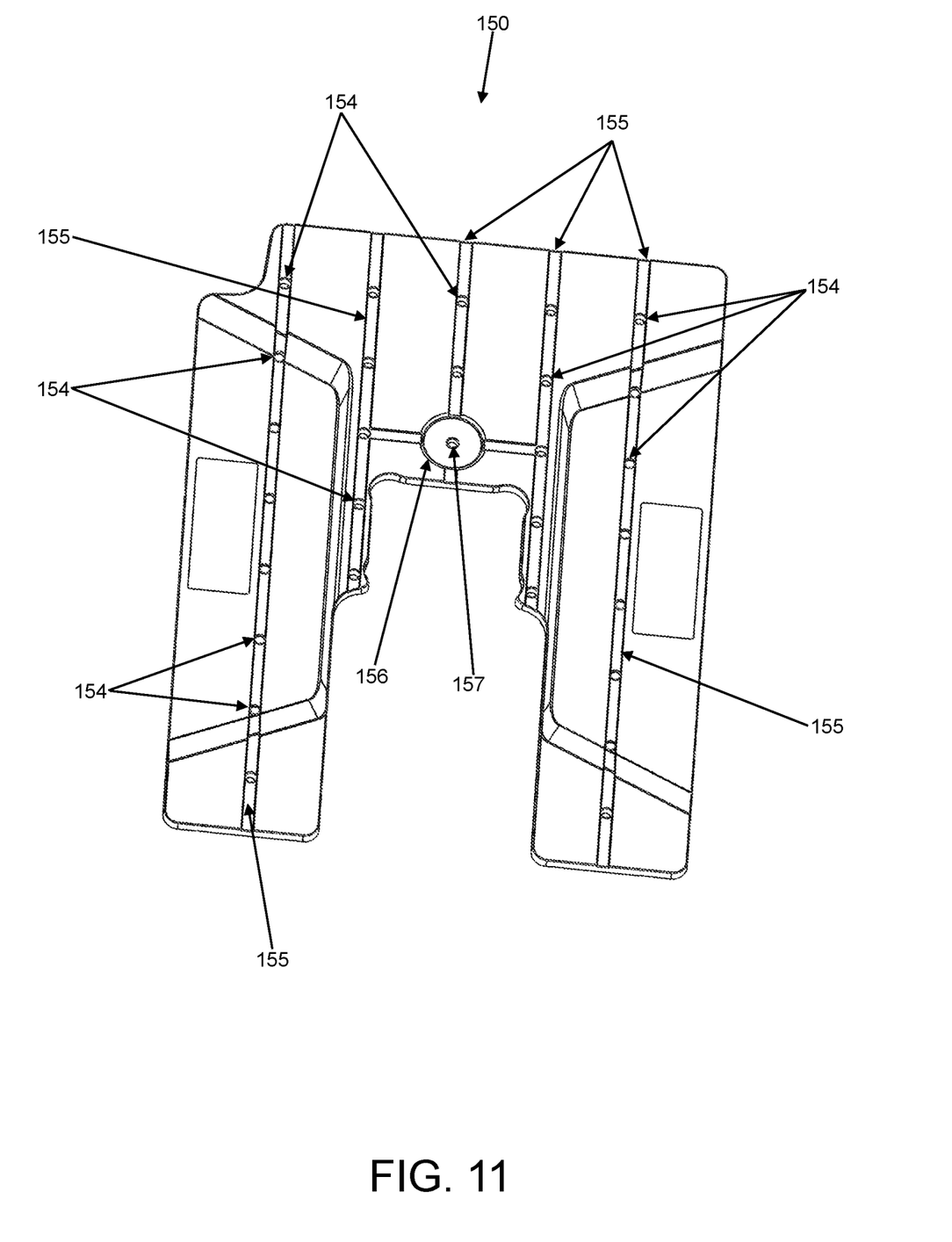
FIG. 11 illustrates an opposite side of the spacer pad of FIG. 10.

FIG. 11 illustrates an alternate side of spacer pad 150. As illustrated, this alternate side of spacer pad 150 includes recessed channels 155, which may have any of the characteristics, features, or functions of recessed channels 153 of FIG. 10. Apertures 154 may also intersect with recessed channels 155 as illustrated to further facilitate the pressure equalization and distribution functions discussed above.

One or more of the recessed channels 155 and apertures 154 may intersect or lead to a cavity 156. Cavity 156 is adjacent pressure equalization membrane 130 of back member 102 (see FIG. 9) when spacer pad 150 is installed in back member 102. In this way, any or all of recessed channels 153, recessed channels 155, apertures 154, and cavity 156 facilitate movement of air or gas from various areas into or out of pressure equalization membrane 130 for purposes of pressure adjustment, relief, and/or equalization. Cavity 156 may also directly include an additional opening 157 which extends to the other side of spacer pad 150. Alternate configurations of these elements are possible when pressure equalization membrane 130 is positioned in a different location and/or multiple pressure equalization membranes are used.

The elements, components, and steps described herein are meant to exemplify some types of possibilities. In no way should the aforementioned examples limit the scope of the invention, as they are only exemplary embodiments.

The phrases "in some embodiments", "in other embodiments", "in some examples", "in other examples", "in some situations", "in one configuration", and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention expect as limited by the prior art.

What is claimed is:

1. A protective enclosure for an electronic device, the electronic device having a touchscreen, the protective enclosure comprising:
a back member configured to fit over a back and at least portions of sides of the electronic device when the electronic device is installed in the protective enclosure, wherein the back member includes a pressure equalization membrane configured to equalize air pressure between an area inside the protective enclosure and an area outside the protective enclosure;
a front member configured to engage with the back member to enclose the installed electronic device, a portion of the front member configured to cover the touchscreen of the installed electronic device, the touchscreen being visible and operable through the portion of the front member when covered by the front member, the front member having clasping features that engage with clasping features of the back member to removably engage the front member with the back member; and
a spacer pad configured to fit between the back of the installed electronic device and an inside surface of the back member, wherein the spacer pad includes one or more air channels extending across a surface of the spacer pad, wherein the pressure equalization membrane is adjacent a portion of the one or more air channels when the spacer pad is in the protective enclosure.

2. The protective enclosure of claim 1 wherein the pressure equalization membrane includes a restricted breathing pressure management device.

3. The protective enclosure of claim 1 wherein the spacer pad includes the one or more air channels on a first side of the spacer pad and also includes one or more additional air channels on a second side of the spacer pad.

4. The protective enclosure of claim 3 wherein the spacer pad includes one or more ports extending between the first side of the spacer pad and the second side of the spacer pad.

5. The protective enclosure of claim 4 wherein the one or more ports each intersect at least a portion of the one or more air channels on the first side and the one or more additional air channels on the second side.

6. The protective enclosure of claim 1 wherein the pressure equalization membrane has a limited maximum airflow rate.

7. The protective enclosure of claim 1 wherein the back member includes a mounting interface.

8. The protective enclosure of claim 7 wherein the mounting interface includes one or more threaded inserts.

9. The protective enclosure of claim 1 further including an internal electrical interface for engaging an electrical connector of the installed electronic device for charging the installed electronic device.

10. The protective enclosure of claim 9 wherein the internal electrical interface is further configured for transmitting data to the installed electronic device and/or receiving data from the installed electronic device.

11. The protective enclosure of claim 9 further including an external electrical interface that is electrically connected to the internal electrical interface for charging the installed electronic device, for transmitting data to the installed electronic device, and/or for receiving data from the installed electronic device from outside the protective enclosure.

12. The protective enclosure of claim 9 further including a wireless charging coil for wirelessly receiving electrical power from outside the protective enclosure, wherein the wireless charging coil is configured for providing at least a portion of the received electrical power to the internal electrical interface for charging the installed electronic device.

13. The protective enclosure of claim 1 further including a removable cap for temporarily covering the pressure equalization membrane.

14. A protective case for use with an electronic device, wherein the electronic device includes a touchscreen, the protective case comprising:
- a back member adapted to fit over a back and at least portions of sides of the electronic device when the electronic device is installed in the protective case, wherein the back member includes a pressure equalization membrane adapted to equalize air pressure between an area inside the protective case and an area outside the protective case;
- a front member adapted to engage the back member to enclose the installed electronic device, a portion of the front member adapted to cover the touchscreen of the installed electronic device, the touchscreen being visible and operable through the portion of the front member when covered by the front member, the front member having clasping features that engage with corresponding clasping features of the back member to removably attach the front member with the back member; and
- a spacer pad adapted to fit between the back of the installed electronic device and an inside surface of the back member, wherein the spacer pad includes one or more channels extending across a first side of the spacer pad and one or more additional channels on a second side of the spacer pad, wherein the pressure equalization membrane is adjacent a portion of the one or more channels when the spacer pad is in the protective case.

15. The protective case of claim 14 wherein the spacer pad includes one or more ports extending between the first side of the spacer pad and the second side of the spacer pad.

16. The protective case of claim 15 wherein the one or more ports each intersect at least a portion of the one or more channels on the first side and the one or more additional channels on the second side of the spacer pad.

17. The protective case of claim 14 wherein the spacer pad is further adapted to conduct heat away from the installed electronic device.

18. The protective case of claim 14 further including an internal electrical interface for engaging an electrical connector of the installed electronic device for charging the installed electronic device.

19. The protective case of claim 18 further including an external electrical interface electrically connected to the internal electrical interface and adapted for charging the installed electronic device.

20. The protective case of claim 18 further including a wireless charging coil for wirelessly receiving electrical power from outside the protective case, wherein the wireless charging coil is adapted for providing at least a portion of the received electrical power to the internal electrical interface for charging the installed electronic device.

* * * * *